United States Patent Office 3,360,577
Patented Dec. 26, 1967

3,360,577
SELECTIVE HYDROGENATION
Wilfred Pickles, Hazel Grove, Stockport, England, assignor to J. R. Geigy, A.G., Basel, Switzerland
No Drawing. Filed Apr. 13, 1964, Ser. No. 359,474
Claims priority, application Great Britain, Apr. 18, 1963, 15,328/63
17 Claims. (Cl. 260—666)

The present invention concerns improvements in or relating to selective hydrogenation and in particular to the production of cycloalkenes by the selective hydrogenation of more highly unsaturated cycloalkenes, for instance cyclodeca-1:5:9-triene and cycloocta-1:5-diene.

Cyclododeca-1:5:9-triene may be prepared by the trimerization of butadiene by Ziegler catalyst systems and can exist theoretically in four isomeric forms, namely the trans:trans:trans-form, the cis:trans:trans-form, the cis:cis:trans-form and the cis:cis:cis-form. Of these isomers, only two have so far been isolated and these are the trans:trans:trans-form of the formula

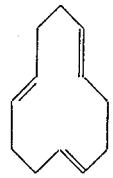

(I)

and the cis:trans:trans-form of the formula

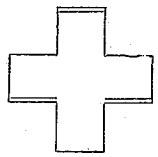

(II)

although recently the formation of the cis:cis:trans-isomer together with the trans:trans:trans- and the cis:trans:trans-isomers has been reported. Throughout the specification and claims, the expression "cyclododecatriene" includes any of the isomers or any mixture thereof.

In order to prepare useful dodecyl derivatives, for example 1:12-dodecanedioic acid, 1:12-dodecanolactam, cyclododecanol or cyclododecanone, from cyclododecatriene it is necessary to convert the cyclic dodecyl molecule containing three active sites into a cyclic dodecyl molecule containing one active site.

It is clear from the literature (see G. Wilke, Angewandte Chemie, 1963, volume 75, page 10) that the selective hydrogenation of cyclododecatriene to cyclododecene has not yet been achieved using hydrogen and conventional hydrogenation catalyst. Mixtures of diene, monoene, cyclododecane and unchanged triene are obtained. Separation of the triene and the monoene is not easy since their boiling ranges overlap and, although cyclododecene and cyclododecane can be separated, it is not an economic procedure since cyclododecane is comparatively inert to further chemical transformations. To be commercially attractive a selective hydrogenation process for the production of cyclododecene from cyclododecatriene must give a substantial yield of the monoene.

A process has been proposed for the selective hydrogenation of an alkene starting material which is more unsaturated than a mono-olefine to a more saturated olefine by reacting with a hydrogen transfer agent in the presence of a hydrogenation catalyst and a displacement solvent. The hydrogen transfer agent is an aliphatic alcohol or tetralin, or a mixture of these materials with gaseous hydrogen, and the displacement solvents are
(1) Ketones or aldehydes,
(2) Amine type compounds such as pyridines, piperidines, mono- and dimethyl aniline,
(3) Phenolic type compounds such as phenol, hydroquinone, naphthol and cresol,
(4) Ether type compounds such as dialkyl ethers, dioxane, tetrahydrofuran, and
(5) Nitriles.

It is said that this process can be used to obtain selective hydrogenation of cyclododecatriene to cyclododecene in very high yields in the order of selectivities of at least 86% along with conversions of about 95%. The proportions of diene, monoene and cyclododecane were determined by mass spectra analysis but when the process was repeated using gas liquid chromatographic analysis the selectivities claimed were not confirmed.

It has also been proposed to hydrogenate ethylenic hydrocarbons in the presence of palladium catalyst, with cyclohexene at its boiling point or with cyclohexene and a suitable solvent such as tetrahydrofuran at the boiling point of the solvent mixture. There was, however, no suggestion that compounds containing more than one double bond could be hydrogenated in this way and, therefore, no information regarding selectivity.

It is an object of the present invention to provide an improved process for the selective hydrogenation of cyclododecatriene and other cycloalkenes containing more than one ethylenic double bond per molecule to the corresponding cycloalka-monoenes.

According to the present invention, a process of producing a cycloalkene containing at least one ethylenically unsaturated double bond per molecule from a more highly ethylenically unsaturated cycloalkene containing the same number of carbon atoms per molecule, comprises contacting the more highly ethylenically unsaturated cycloalkene in the presence of a palladium hydrogenation catalyst with a cyclic hydrogen-donating compound having in the molecule a non-aromatically unsaturated hydrocarbon ring containing six carbon atoms.

The cycloalkene used as starting material contains more than one ethylenically unsaturated double bond per molecule and may be a cycloalkene containing from 6 to 20 carbon atoms per molecule in the carbocyclic ring system. The process is applicable with particular advantage to the hydrogenation of cycloalkenes containing from 8 to 14 carbon atoms per molecule in the carbocylic ring system, for example, a cyclooctadiene or a cyclododecatriene. The cyclic alkene starting material will generally be a compound which can theoretically exist in any of a number of stereo-isomeric forms; although the process of the invention is not limited to the hydrogenation of particular stereo-isomers, it may be found that the process is applicable with greater advantage to certain stereo-isomers of the cycloalkene, for instance because of difference in their degree of reactivity or because of the greater commercial availability of certain of the isomers. For example, if the cycloalkene starting material is to be a cyclododeca-1:5:9-triene, this may be the trans:trans:trans-isomer or the cis:trans:trans-isomer or either of the other possible isomeric forms. The cycloalkene may be pure or substantially pure compound, but it may also be a mixture of two or more stereo-isomers, with or without other organic compounds, as such mixtures may be cheaper or more readily available starting materials.

The cyclic alkene may be an unsubstituted olefinic hydrocarbon or a mixture of unsubstituted olefinic hydrocarbons, or the starting material may be or comprise one or more cycloalkenes substituted in the carbocyclic system, for instance with an alkyl, cycloalkyl, aryl or other group not having a substantially adverse effect on the desired hydrogenation to produce the corresponding cycloalka-mono-ene.

The cycloalkene may be, for example, a cyclooctadiene or other cycloalkadiene or a cyclododecatriene or other cycloalkatriene.

The process may be carried out to convert a cycloalkadiene to the corresponding cycloalka-mono-ene, by the uptake of one molar proportion of hydrogen per molar proportion of the cycloalkadiene, or, as in the case of the hydrogenation of a cyclododecatriene to cyclododecene, to convert a cycloalkene containing more than two ethylenically unsaturated double bonds per molecule to the corresponding cycloalka-mono-ene by the uptake of more than one molar proportion of hydrogen per molar proportion of the cycloalkene starting material. The cycloalkene starting material may be the pure cycloalkene or substantially pure cycloalkene or in the form of a mixture of the cycloalkene with one or more impurities or diluents, provided that those substances are such as do not substantially inhibit the activity of the catalyst or otherwise have a deleterious effect on the course of the reaction.

The cycloalkene starting material may be reacted with the hydrogen-donating unsaturated compound within a wide range of pressure. While it may generally be convenient to carry out the hydrogenation of the cycloalkene at or about atmospheric pressure, the process may, if desired, be carried out at a superatmospheric pressure, for instance, in an autoclave. The process is, however, preferably carried out by boiling the reactants together under reflux in the presence of the palladium catalyst. The hydrogenation is carried out in the presence of a palladium hydrogenation catalyst which may be in the form of a palladium black, or other finely divided palladium, or may be in the form of palladium supported on any of a variety of supporting media, for example, silica, alumina, asbestos, calcium carbonate, charcoal, pumice or other media conventionally employed as supporting media for platinum group metal catalysts. However, only palladium used as catalyst metal in the process according to the invention affords satisfactory yields of the desired mono-ene end product. Neither Raney nickel nor other conventional catalysts such as platinum will do so.

The process may be carried out in the presence or in the absence of an added organic solvent. Examples of hydrocarbon or alcohol solvents which may be used include benzene and other aromatic hydrocarbons; petroleum ether and other aliphatic hydrocarbons; cyclohexane and other saturated cyclo-aliphatic hydrocarbons; methanol and other alcohols; and mixtures of two or more of these compounds. As solvents there may also be used, either as sole solvent or in admixture with a compound or mixture listed above, an organic compound containing a reactive carbonyl, amine, phenol ether or other group non-reducible under the reaction conditions, or a mixture of two or more such compounds; these solvents may behave differently in the course of the reaction from the exemplified hydrocarbon or alcohol types of solvent and, if they are present, the process is carried out at a pressure not exceeding 50 atmospheres. Although the reaction may be effected in an organic solvent if desired, the presence of an added organic solvent is not, in general, essential for the hydrogenation of the cycloalkene starting material to take place to obtain a high proportion of the cycloalka-mono-ene in the hydrogenation product.

However, both the type of hydrogenation catalyst described above, and the cyclic, hydrogen-donating compound used in the process according to the invention (which compound has, in the molecule, a six-membered, non-aromatically unsaturated hydrocarbon ring) are critical for obtaining a successful selectivity and, correspondingly, a satisfactory yield of the desired mono-ene product.

The compound may be dehydrogenated under the reaction conditions to form an aromatic compound containing the same number of carbon atoms per molecule. The cyclic, hydrogen-donating compound may be, for example cyclohexene, an alkyl-cyclohexene, a cyanocyclohexene, α-phellandrene, or the material known as "technical dipentene" obtainable commercially from several suppliers and containing a mixture of cyclic compounds. The compound used as hydrogen donor may contain, in the molecule, two ethylenic double bonds in a six-membered hydrocarbon ring, such that the removal of two atoms of hydrogen from the structure results in the formation of an aromatic ring, or the compound used may contain only one ethylenic double bond in a six-membered hydrocarbon ring such that four atoms of hydrogen are removable from the structure during the reaction to aromatize the ring.

If the cycloalkene starting material is a cyclo-alkatriene, it is preferred to have present at the beginning of the process at least 1.5 molar proportions of the cyclic hydrogen-donating compound per molar proportion of the cycloalkatriene. If the cycloalkene starting material is a cycloalkadiene, it is preferred to have present at the beginning of the process at least four molar proportions of the cyclic hydrogen-donating compound per molar proportion of the cycloalkadiene.

Cycloalkenes containing one ethylenically unsaturated double bond per molecule produced by the process of the invention, are useful intermediates in the production of other valuable organic compounds. The cycloalkenes may be oxidised by known methods at the ethylenic double bond to produce aliphatic dicarboxylic acids. Cyclooctene, cyclodecene, and cyclododecene produced by the process of the invention may be oxidised, for example, to produce suberic acid, sebacic acid and 1:12-dodecanedionic acid, respectively. Cycloalkenes produced which contain more than one ethylenically unsaturated double bond per molecule may be further hydrogenated to the corresponding cycloalka-mono-enes.

The following examples further illustrate the present invention. Parts by weight shown therein bear the same relation to parts by volume as do kilograms to litres. Percentages are expressed by weight unless otherwise stated.

EXAMPLE 1

A mixture of 3.24 parts by weight of cis:trans:trans-cyclododeca-1:5:9-triene, 3.28 parts by weight of cyclohexene and 0.05 part by weight of palladium black were heated under reflux for 17 hours.

The catalyst was then removed by filtration and the low boiling fraction consisting of cyclohexene and the benzene was removed by distillation at 15 millimetres of mercury. The residue, amounting to 2.4 parts by weight (some mechanical loss occurred) was analysed by gas/liquid chromatographic analysis and was found to contain 59.8% of trans-cyclododecene, 34.4% of cis-cyclododecene and 5.8% of cyclododecane.

The low boiling fraction was found by gas/liquid chromatographic analysis to contain 46.0% of cyclohexene and 54.0% of benzene.

EXAMPLE 2

A mixture of 3.24 parts by weight of cis:trans:trans-cyclododeca-1:5:9-triene, 3.28 parts by weight of cyclohexene, 25 parts by volume of tetrahydrofuran and 0.05 part by weight of palladium black was heated under reflux for 17 hours.

The catalyst was then removed by filtration and the tetrahydrofuran and cyclohexene/benzene fraction was removed by heating the filtrate on the steam bath at 15 millimetres of mercury pressure. The residue, amounting to 3.42 parts by weight was a pale yellow liquid, was found on gas/liquid chromatographic analysis to contain 6% of cyclododecane, 55.6% of trans-cyclododecene and 29.1% of cis-cyclododecene.

The yield of monoene (assuming that the product contains 84.7% pure monoene) was 87%.

EXAMPLE 3

The procedure described in Example 2 was carried out, using 3.24 parts by weight of cyclododeca-1:5:9-triene, 6.56 parts by weight of cyclohexene and 25 parts by volume of tetrahydrofuran.

The product, amounting to 3.55 parts by weight contained 7.4% of cyclododecane, 54.5% of trans-cyclododecene, and 30% of cis-cyclododecene.

The yield of monoene (assuming that the product contains 84.5% pure monoene) was 90.5%.

EXAMPLE 4

A mixture of 3.24 parts by weight of trans:trans:trans-cyclododeca-1:5:9-triene, 3.28 parts by weight of cyclohexene, 25 parts by volume of tetrahydrofuran and 0.05 part by weight of palladium black was heated under reflux for 17 hours. The products were isolated and subjected to gas/liquid chromatographic analysis.

The residue, after removal of the tetrayhdrofuran and cyclohexene/benzene fraction, was found to contain 62.2% of trans-cyclododecene, 34.3% of cis-cyclododecene and 3.5% of cyclododecane.

EXAMPLE 5

A mixture of 2.16 parts by weight of cycloocta-1:5-diene, 6.56 parts by weight of cyclohexene and 0.05 part by weight of palladium black was heated under reflux for 17 hours. The catalyst was removed by filtration and the filtrate was distilled until the temperature of the distillate reached 100° C. The fraction having a boiling point up to 100° C. and the residue having boiling point above 100° C. were analysed by gas/liquid chromatography. The low boiling fraction was found to contain cyclohexane, cyclohexene, benzene and a small amount of cyclooctene. The residue was found to contain small amounts of cyclohexane, cyclohexene, benzene and some cyclooctane, but was mainly cyclooctene. Cyclooctadiene was not detected.

From the weights of the low boiling fraction and the residue, and the analytical figures, the reaction product was found to consist of 89.6% cyclooctene and 10.4% cyclooctane.

EXAMPLE 6

A mixture of 3.24 parts by weight of cis:trans:trans-cyclododeca-1:5:9-triene, 21.76 parts by weight of technical dipentene (obtained from British Drug Houses Limited, London) and 0.05 part by weight of palladium black was boiled under reflux conditions for 17 hours.

After this time, the catalyst was removed and the resulting mixture was heated to 100° C. at a pressure of 12 to 15 millimetres of mercury in order to remove dipentene. Two fractions were obtained; the lower boiling fraction comprised dispentene and amount to 18.25 parts by weight, and the higher boiling fraction, amounting to 4.6 parts by weight, contained the desired product.

The higher boiling fraction had the following composition, as determined by gas/liquid chromatographic analysis:

| | Percent |
|---|---|
| Cyclododecane | 1 |
| Trans-cyclododecene | 58.0 |
| Cis-cyclododecene | } 37.5 |
| Trans:trans:cyclododecadiene | |
| Unchanged cyclododecatriene | 3.5 |

EXAMPLE 7

The procedure described in Example 6 was carried out using α-phellandrene instead of the technical dipentene, the reaction conditions being otherwise the same.

The mixture, after separating the catalyst, was fractionated into two fractions. The fraction having boiling range up to 100° C. at 12 millimetres of mercury pressure mounted to 20 parts by weight. The higher boiling fraction amounted to 3.6 parts by weight and the $C_{12}$ component of this fraction had the following composition:

| | Percent |
|---|---|
| Cyclododecane | 0.5 |
| Cyclododecenes | 66.4 |
| Cyclododecadienes | 30.1 |
| Cyclododecatriene | 3.0 |

The above Examples 1 to 7 demonstrate that, by the process of the present invention, cycloalkenes containing more than one ethylenic double bond in the molecule may be readily selectively hydrogenated to the corresponding cycloalka-mono-enes in high yield without needing complicated apparatus, the addition of hydrogen or displacement solvents, or the use of stoichimetric proportions of reactants necessary in previously known selective hydrogenation processes.

I claim:

1. A process of producing a cycloalkene containing at least one ethylenically unsaturated double bond per molecule from a more highly ethylenically unsaturated cycloalkene containing the same number of carbon atoms per molecule, which comprises contacting the more highly ethylenically unsaturated cycloalkene in the presence of a palladium hydrogenation catalyst with a cyclic hydrogen-donating hydrogenation compound, the essential structural moiety of whose molecule is a six-membered nonaromatically unsaturated carbocyclic ring, which ring is convertible by the release of hydrogen from said compound to an aromatic ring, whereby said higher unsaturated cycloalkene is selectively hydrogenated to a product the major portion of which consists of the corresponding cyclomonoene.

2. A process as defined in claim 1 wherein the cycloalkene used as starting material contains from 6 to 20 carbon atoms per molecule in the carbocyclic ring system.

3. A process as defined in claim 1 wherein the cycloalkene used as starting material contains from 8 to 14 carbon atoms per molecule in the carbocyclic ring system.

4. A process as defined in claim 1 wherein the cycloalkene starting material is a cycloalkadiene of from 6 to 20 carbon atoms.

5. A process as defined in claim 1 wherein the cycloalkene starting material is a cycloalkatriene of from 8 to 14 carbon atoms.

6. A process as defined in claim 1 wherein the cycloalkene starting material is a cyclooctadiene.

7. A process as defined in claim 1 wherein the cycloalkene starting material is a cyclododecatriene.

8. A process as defined in claim 1 wherein the cycloalkene starting material is reacted with the hydrogen-donating compound by boiling the reactants together under reflux in the presence of the palladium hydrogenation catalyst.

9. A process as defined in claim 1 wherein the hydrogenation catalyst is palladium black.

10. A process as defined in claim 1 wherein the hydrogenation catalyst is palladium supported on a member selected from the group consisting of silica, alumina, asbestos, calcium carbonate, charcoal and pumice.

11. A process as defined in claim 1 wherein the process is carried out in the presence of an inert organic solvent.

12. A process as defined in claim 1 wherein the cyclic hydrogen-donating compound is a member selected from the group consisting of cyclohexene, an alkyl-cyclohexene, a cyanocyclohexene, α-phellandrene and technical dipentene.

13. A process as defined in claim 1 wherein the cycloalkene starting material is a cycloalkatriene of from 8 to 14 carbon atoms and at least 1.5 molar proportions of the cyclic hydrogen-containing compound are present at the beginning of the process per molar proportion of the cycloalkatriene.

14. A process as defined in claim 1 wherein the cycloalkene starting material is a cycloalkadiene of from 6 to 20 carbon atoms and at least four molar proportions of the cyclic hydrogen-donating compound are present at the beginning of the process per molar proportion of the cycloalkadiene.

15. A process as defined in claim 1, wherein said starting cycloalkene is a cycloalkadiene of from 6 to 20 carbon atoms or a cycloalkatriene of from 8 to 14 carbon atoms; and wherein said cyclic hydrogen-donating compound is a member selected from the group consisting of cyclohexene, an alkyl-cyclohexene, a cyanocyclohexene, α-phellandrene and technical dipentene.

16. A process as defined in claim 5, wherein the catalyst is palladium black and the hydrogen-donating hydrogenation compound is cyclohexene at least 1.5 molar proportions of which are present at the beginning of the process per molar proportion of cycloalkatriene.

17. A process as defined in claim 16, wherein the cycloalkatriene is a cyclododecatriene.

References Cited

UNITED STATES PATENTS

| | | | |
|---|---|---|---|
| 3,022,359 | 2/1962 | Wiese et al. | 260—666 |
| 3,182,093 | 5/1965 | Wellman | 260—667 |

PAUL M. COUGHLAN, JR., *Primary Examiner.*

DELBERT E. GANTZ, *Examiner.*

V. O'KEEFE, *Assistant Examiner.*